F. G. WHITE.
POWER TRANSMISSION MEANS.
APPLICATION FILED JUNE 20, 1921.

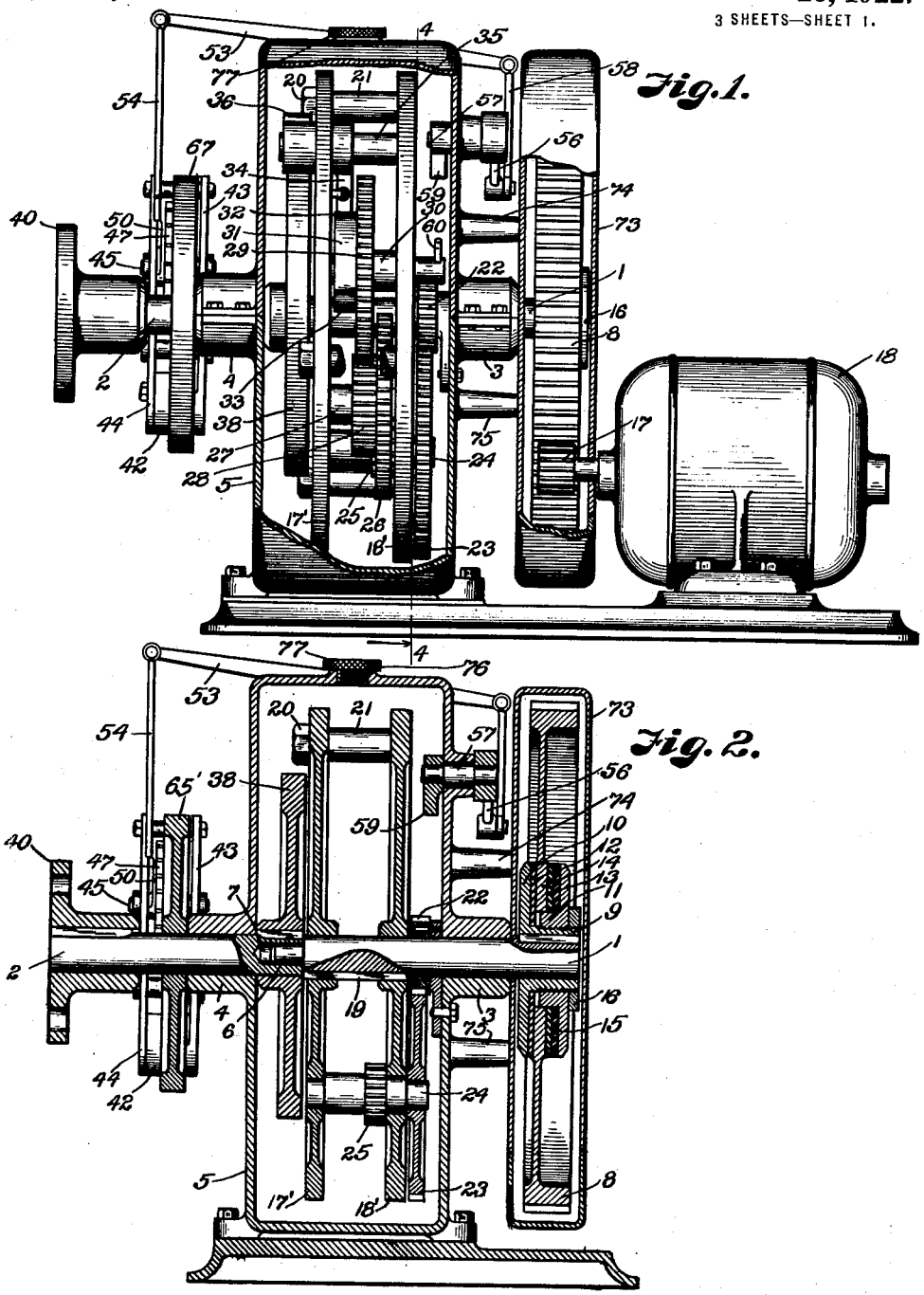

1,437,373.

Patented Nov. 28, 1922.
3 SHEETS—SHEET 2.

INVENTOR
Fred G. White.
BY
ATTORNEY

F. G. WHITE.
POWER TRANSMISSION MEANS.
APPLICATION FILED JUNE 20, 1921.

1,437,373.  Patented Nov. 28, 1922.
3 SHEETS—SHEET 3.

INVENTOR
Fred G. White.
ATTORNEY

Patented Nov. 28, 1922.

1,437,373

UNITED STATES PATENT OFFICE.

FRED GEORGE WHITE, OF KANSAS CITY, MISSOURI, ASSIGNOR TO LEWIS R. LONG, OF KANSAS CITY, MISSOURI.

POWER-TRANSMISSION MEANS.

Application filed June 20, 1921. Serial No. 478,818.

*To all whom it may concern:*

Be it known that I, FRED GEORGE WHITE, a citizen of the United States, residing at Kansas City, in the county of Jackson and State of Missouri, have invented certain new and useful Improvements in Power-Transmission Means; and I do declare the following to be a full, clear, and exact description of the invention, such as will enable others skilled in the art to which it appertains to make and use the same, reference being had to the accompanying drawings, and to the figures of reference marked thereon, which form a part of this specification.
This invention relates to power transmission means and one of the objects of the invention is to provide a driving means and a driven means in which the driving means operates continuously at approximately the same speed and intermittently drives the driven means, there being certain timing mechanism between the driving means and the driven means so that the driven means will be operated at definite intervals in the cycle of rotation of the driving means.

Means is also provided whereby the driven means will come to a definite state of rest in proper time relation with respect to the driving means so that there will be no overrunning of the driven means due to the inertia, velocity or from any other cause.

The mechanism illustrated in the drawings is particularly applicable for use in connection with intermittently operating signs although it is not necessarily limited to such use and while I have shown an electric motor as the prime mover for supplying the power, I would have it understood that I do not limit myself to any specific form of power device.

In the drawings,

Fig. 1 is an end view of a power transmitting mechanism, parts of the casing being broken away to show the gearing, etc.
Fig. 2 is a vertical, longitudinal, sectional view through the power transmission mechanism.

Figure 3:
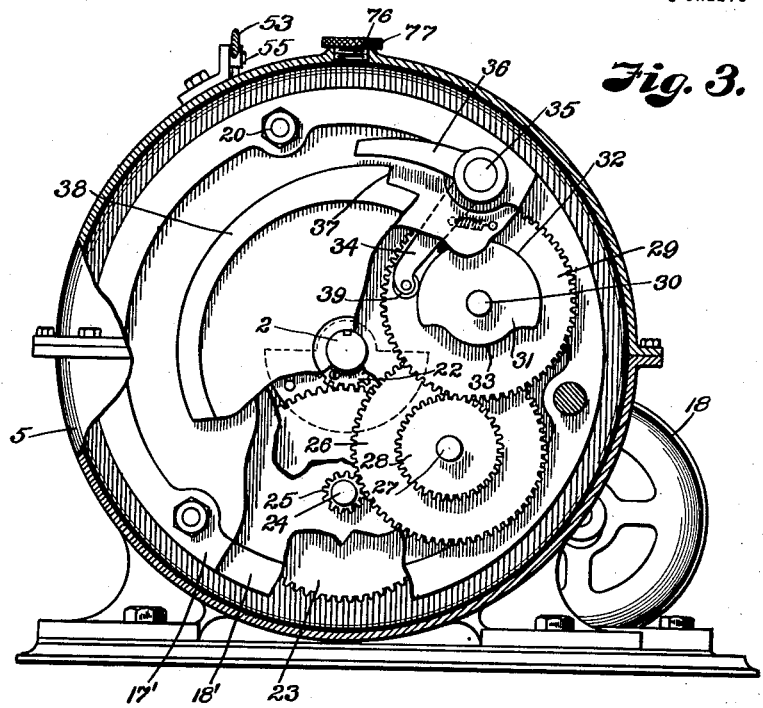
Fig. 3 is a side view of the timing mechanism, parts being broken away to more clearly illustrate certain other parts.
Figure 4:
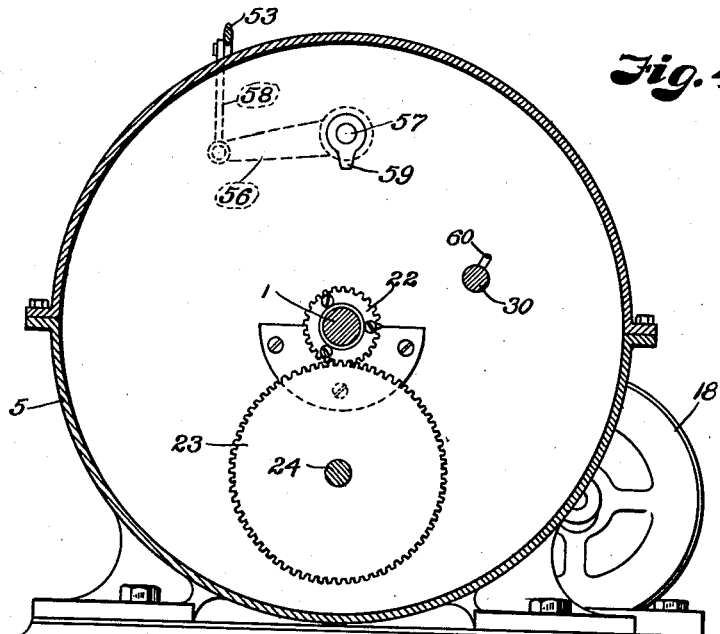
Fig. 4 is a sectional view on the line 4—4 of Fig. 1.

Referring now to the drawings by numerals of reference:

1 designates the driving element and 2 the driven element. These two elements are shown as consisting of shafts mounted in bearings 3 and 4 in opposite sides of the casing 5. One end of the shaft 1 is provided with a restricted projection or portion 6, receivable within the recess 7 in the shaft 2 so that the two shafts are in axial alignment, the shaft 1, however, being rotatable independent of the shaft 2, as will be clearly described hereinafter.

On the outer end of the shaft 1 is a gear 8, held by the friction clutch consisting of the sleeve member 9 with a flange 10 and an adjustable sleeve member 11 carried thereby and having friction elements 12 and 13 on opposite sides of the web 14 of the gear so that when the element 11 is tightened on the sleeve 9, the desired friction can be obtained to normally hold the gear rigid with respect to the shaft but the web is so secured that the gear may turn with respect to the shaft to prevent breaking of any of the mechanism in the event that any of the mechanism fails to function.

The friction element 13 is provided with cushion disks 15, as clearly seen in Fig. 2, and the member 9 is held in its adjusted position by a jam nut 16. The gear 8 is driven by a pinion 17 on the shaft of the prime mover 18 so that power will be communicated to the shaft 1.

The shaft 1 carries within the casing 5 two spaced disks 17' and 18', which are keyed thereto by a key 19 and the disks are secured together by the bolts 20, the spacers 21 maintaining the proper relative distance between the disks.

Secured rigidly to the inside of the case 5 and opposite the bearing 3 is a pinion 22, meshing with a gear 23 on a rotatable shaft 24, journaled in the two disks 17' and 18'. The shaft 24 carries a pinion 25 between the disks 17' and 18' and which meshes with a gear 26 on the shaft 27 journaled in the disks, the shaft 27 carrying a smaller gear 28 rigid therewith, which, in turn, meshes with the teeth of the gear 29 on a cam shaft 30, carrying a cam 31 having about two-thirds of its surface, as at 32, concentric with the shaft 30, the remaining portion 33 of the cam being so generated as to permit functional movement of a crank arm 34 on a crank 35 so as to permit the dog or pawl 36 to engage the notch or shoulder 37 on the disk 38 rigid with the driven shaft 2.

By reference to Figs. 1, 2 and 3, it will be apparent that when the shaft 1 is driven through the prime mover 18, pinion 17 and gear 8, the disks 17' and 18' will rotate with it. The gear 23 will be carried along with the disks and since its teeth mesh with the rigid pinion 22, it will revolve about the pinion but rotate on its own axis, thereby supplying sufficient power to operate the train of gearing, which constitutes the timing means for throwing the dog or pawl 36 into engagement with the disk 38 so as to drive the shaft 2, it being understood that the only time that the shaft is driven is when the pawl 36 bears against the shoulder 37 on the disk 38. The relation of the drive shaft with the cam 31, as shown, is such that there will be forty-two revolutions of the shaft 1 for one revolution of the cam shaft 30 so the roller 39 on the arm 34 will be on high lobe 32 of the cam 31 during the time that the shaft 1 is making twenty-eight revolutions and on the low lobe 33 while the shaft 1 is making fourteen revolutions. Thus the shaft 1 will rotate twenty-eight times while the disk 38, and consequently the shaft 2, is stationary, and the shaft 1 will rotate fourteen times while the disk 38, and consequently the shaft 2, is rotating due to the fact that the dog 36 will be effective during one-third of the period that the shaft 1 is rotating forty-two times. Assuming then that forty-two revolutions of the shaft 1 constitutes a cycle of operations of the entire mechanism, it will be apparent that the disk 38 will be stationary two-thirds of the time and moving one-third of the time.

Since the driven shaft 2 is designed, through its coupling 40, to actuate certain mechanism (not shown) for example, a movable sign, it is apparent that there will be a tendency for the driven shaft to overrun when the dog 36 moves out of engagement with the disk 38 so that the proper timing relation for the effective connection between the driving and driven elements would not be uniformly maintained unless some special provision was made to bring the driven element to a state of rest at a uniformly definite period during each cycle of operations of the mechanism.

In order to insure the proper relative position of the notch or tooth 37 on the disk 38 with respect to the pawl or dog 36 at the time of pick-up between the pawl and the disk, I have provided a novel form of automatic lock and release means for the driven shaft and this is best shown in Figs. 1, 2, 5 and 6.

Figure 5:
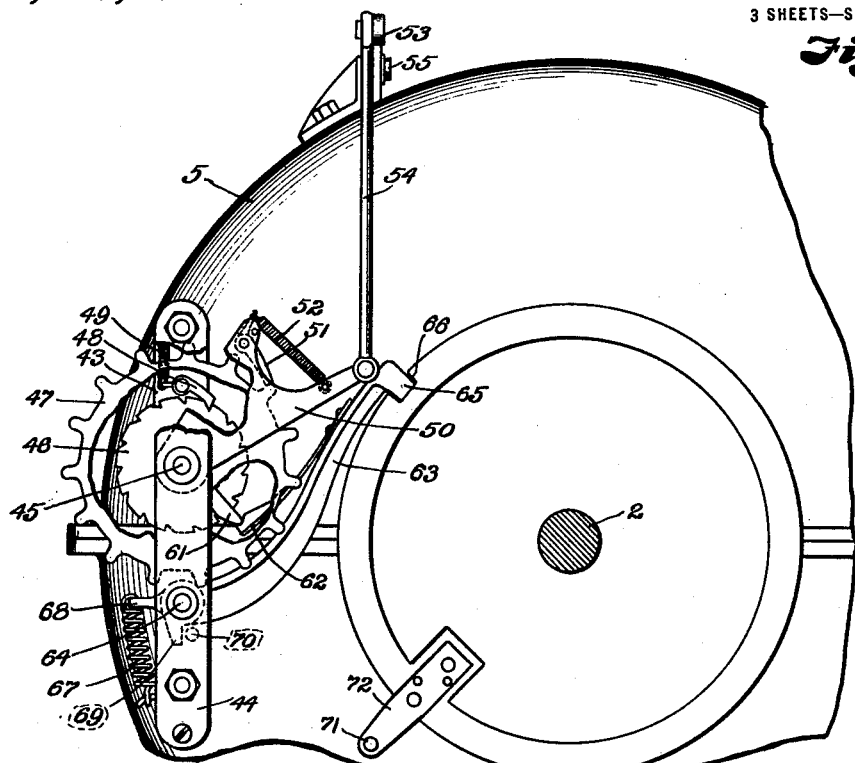
Fig. 5 is an enlarged detail view of the stop controlling mechanism for the driven elements, and Figure 6:
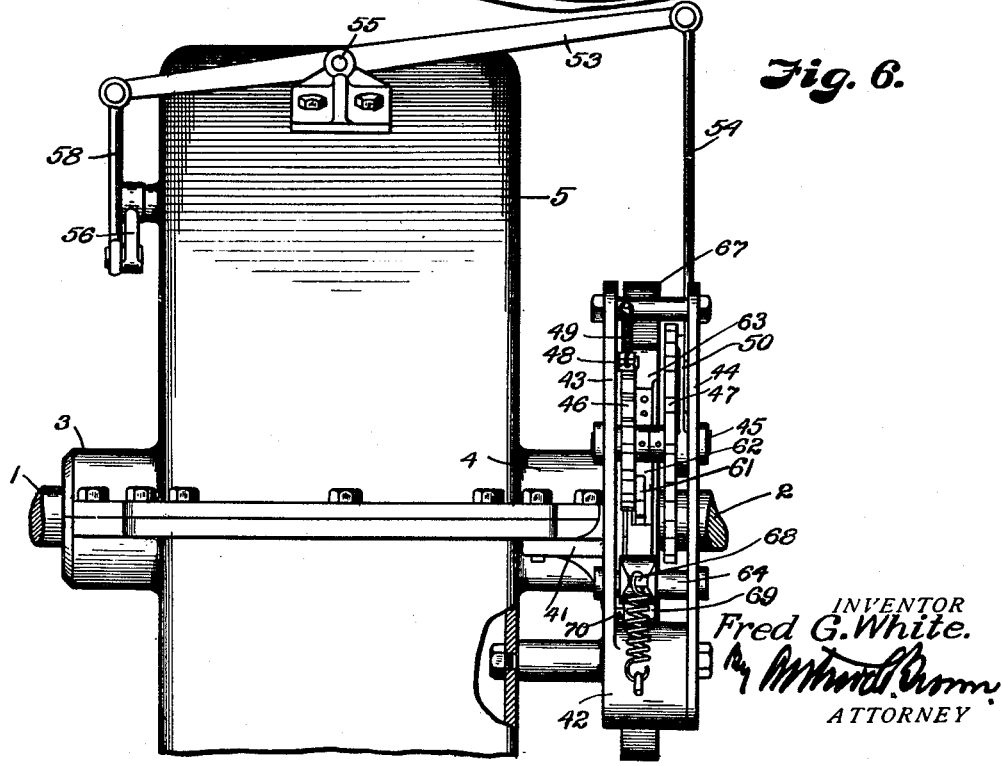
Fig. 6 is an edge view of the same.

Referring to Figs. 5 and 6, it will be seen that there is a bracket 41 fastened to the case 5 and carrying a substantially U-shaped frame consisting of a casting 42 having an upstanding arm 43 and a cover plate 44 secured thereto so that a substantially U-shaped frame is provided for the starting and stopping mechanism.

Journaled between the arms 43 and 44 and rigid on the shaft 45 are two wheels 46 and 47, the former of which is a ratchet and the other a toothed wheel. The ratchet wheel is provided with fifteen notches and the toothed wheel 47 is provided with fifteen spaces. The ratchet wheel is adapted to be normally engaged by a pawl 48, urged into position by the spring 49. There is a lever 50 loosely mounted on the shaft 45 and it carries a spring-actuated dog 51, urged into engagement with one of the teeth on the wheel 47 by the spring 52. The lever or arm 50 is connected to an actuating lever 53, through the medium of a link 54 and the lever 53 is pivoted at 55 to the case 5, one end of which is connected to the arm 56 of a rock shaft 57 through the medium of a link 58. A finger 59 is carried by the shaft 57 and it is adapted to be actuated by the finger 60 on the cam shaft 30, once for every complete cycle of operation. That is, when the drive shaft 1 makes forty-two revolutions, the finger 60 will contact with the finger 59, rocking the shaft 57 and through the link 58, lever 53, and link 54, depress the arm or lever 50 so that its dog 51 will contact with one of the teeth on the wheel 47 and rotate it in a clockwise direction, moving with it the ratchet wheel 46 which, in addition to being engaged by the pawl 48, carries a finger 61 adapted to bear against the flat spring 62 carried by the locking pawl 63 pivoted at 64 to the frame consisting of the members 43 and 44 and having at one end a tooth 65 which may engage the notch 66 in the disk 67 rigid on shaft 2.

The tooth 65 is normally urged out of engagement with the notch 66 by a coil spring 67, one end of which is fixed to the heel 68 of the lever arm 63 and the other anchored to the frame. The lever arm 63 is provided with a stop projection 69, adapted to engage a pin 70 so as to limit its swinging movement in one direction.

If the parts are assembled as shown in Fig. 5 and the dog 36 is about to drop into engagement with the notch 37, the finger 60 will contact with 59 to actuate the arm 50 through the medium of the links to rotate the wheel 47 one tooth, which will be enough to move the finger 61 out of engagement with the spring 62, allowing the spring 67 to withdraw the tooth 65 from the notch 66 so as not to interfere with the rotation of the shaft 2 when it is to be driven by the driving shaft 1.

Since the disk 67 will be released at this time and the roller 39 will be riding over the low lobe 33 of the cam 31, it will be apparent that the driven element will be free to rotate one-third of a cycle or while the shaft 1 is rotating fourteen times. This will permit the dog 36 to rotate the disk 38 fourteen times and since the disk 67 is fastened on the shaft 2, it will rotate fourteen times for each cycle. A pin 71, extending laterally from the projection 72 on the disk 67, will come in contact with a tooth on the wheel 47, moving the one tooth and consequently, moving the ratchet 46 and the finger 61 one-fifteenth of a revolution so that by the time the disk 67 has rotated fourteen times, the finger 61 will be back again to the position shown in Fig. 5, bearing upon the spring 62 to oppose the spring 67 and force the tooth 65 into engagement with the notch 66. At the same time the high lobe 32 of the cam 31 has forced the roller 37 in the position shown in Fig. 3 to move the dog 36 out of engagement with the shoulder or notch 37. Therefore, the shaft 1 will continue to rotate for twenty-eight revolutions before the high lobe of the cam 31 has moved off 39 to allow the dog 36 to drop back into notch-engaging position and before the finger 60 has moved around to contact with 59 again.

In actual practice the tooth 65 will be bearing against the perimeter of the disk 65 before the tooth registers with the opening 66 so that it will be ready to drop into notch-engaging position at the moment that the dog 36 moves out of engagement with the shoulder or tooth 37 so that the driven element will come to a state of rest immediately the driving and driven elements are disconnected. Therefore, there can be no overrunning of the driven element due to inertia, velocity, etc., and on account of the locking and releasing mechanism, the driven element will always maintain its definite co-operative relation with respect to the driving element. By this means lost motion between the parts or failure of operation will be avoided.

The gear 8 is provided with a gear case 73, which may be connected to the case 5 by the studs 74 and 75 and if desired, the stopping and releasing mechanism may be enclosed in a housing of appropriate design.

If desired the case 5 may be filled with oil or other lubricant which may be introduced through the opening 76, normally closed by a cap 77.

It will be apparent from the foregoing that the driving device may operate continuously at the same speed and intermittently operate the driven element, the mechanism being such that the parts will be maintained in their proper co-operative relation at all times.

What I claim and desire to secure by Letters-Patent is:

1. In a device of the class described, a driving member and a driven member, one of which is provided with a notched disk and the other with a pawl, means under the control of the driving member for actuating said pawl to move it into and out of engagement with the disk, said means comprising a train of gearing, a notched disk on the driven shaft, a stop pawl for engagement with the notch in the disk, and means under the control of the driving member for causing the stop pawl to engage the notch in the disk when the first named pawl is out of engagement with its disk and to move the stop pawl out of engagement with the notch in its disk when the first pawl is in engagement with its disk.

2. In a device of the class described, a driving shaft and a driven shaft, said shafts being in alignment, a disk carried by the first named shaft, a pawl mounted thereon, a disk carried by the second mentioned shaft and having a notch for engagement with the pawl, a train of gearing carried by the first named disk for timing the pawl with relation to the rotative movement of the driving shaft so as to cause it to engage the disk on the driven shaft at determined intervals during the rotative movement of the driving shaft, and a stop mechanism under the control of the driving shaft and effective to hold the driven shaft rigid when the pawl is out of engagement with the disk on the driven shaft and to permit the driven shaft to rotate when the pawl is in engagement with the notch on the driven shaft.

3. In a device of the class described, a driving shaft and a driven shaft, a pawl and ratchet connection between the driven shaft and driving shaft, a timing mechanism under the control of the driving shaft for rendering the pawl and ratchet mechanism effective and ineffective, a stop mechanism for the driven shaft, an actuator under the control of the driving shaft to render the stop mechanism ineffective when the ratchet mechanism is effective, and a step-by-step operating mechanism under the control of the driven shaft for rendering the stop mechanism effective when the pawl and ratchet mechanism is ineffective.

4. In a device of the class described, a driving shaft and a driven shaft, a pawl and ratchet connection between the driven shaft and driving shaft, a timing mechanism under the control of the driving shaft for rendering the pawl and ratchet mechanism effective and ineffective, a stop mechanism for the driven shaft, an actuator under the control of the driving shaft to render the stop mechanism ineffective when the ratchet mechanism is effective, and an operating mechanism under the control of the driven shaft for rendering the stop mechanism effective when the pawl and ratchet mechanism is ineffective.

5. In a device of the class described, a driving shaft and a driven shaft, a pawl and ratchet connection between the driven shaft and driving shaft, a timing mechanism under the control of the driving shaft for rendering the pawl and ratchet connection effective and ineffective, a stop mechanism comprising a disk, a spring-actuated pawl to engage a notch in the disk and a rotatable wheel having a part to bear against the pawl to move it into engagement with the disk to render it effective, and releasing mechanism for the locking pawl under the control of the driving shaft.

6. In a device of the class described, a driving shaft, a driven shaft, intermittently operating connections between the driven shaft and the driving shaft, a timing mechanism under the control of the driving shaft for rendering the intermittently operating connections effective and ineffective, a stop mechanism for the driven shaft, an actuator under the control of the driving shaft to render the stop mechanism ineffective when the intermittently operating mechanism is effective, and a step-by-step operating mechanism under the control of the driven shaft for rendering the stop mechanism effective when the intermittently operating mechanism is ineffective.

7. In a device of the class described, two shafts, said shafts being in alignment, a disk carried by one of the shafts, a pawl mounted thereon, a disk carried by the other shaft and having a notch for engagement with the pawl, a train of gearing carried by the first named disk for timing the pawl with relation to the rotative movement of its driving shaft, so as to cause it to engage the disk on the other shaft at determined intervals during the rotative movement of the driving shaft, and a stop mechanism effective to hold the driven shaft rigid when the pawl is out of engagement with the disk on the other shaft and permitting said shaft to rotate when the pawl is in engagement with the notch on the driven disk.

In testimony whereof I affix my signature.

FRED GEORGE WHITE.